(No Model.)

J. W. ROBERTS.
PARIS GREEN DISTRIBUTER.

No. 495,432. Patented Apr. 11, 1893.

Witnesses:
Hamilton D. Turner
Murray C. Boyer

Inventor:
Jesse W. Roberts
by his Attorneys
Howson & Howson (No Model.) 2 Sheets—Sheet 2.

J. W. ROBERTS.
PARIS GREEN DISTRIBUTER.

No. 495,432. Patented Apr. 11, 1893.

Witnesses:
Hamilton D. Turner
Murray C. Boyer

Inventor:
Jesse W. Roberts
by his Attorneys

UNITED STATES PATENT OFFICE.

JESSE W. ROBERTS, OF PHILADELPHIA, PENNSYLVANIA, ASSIGNOR OF ONE HALF TO SETH K. SAMMS, OF SAME PLACE.

PARIS-GREEN DISTRIBUTER.

SPECIFICATION forming part of Letters Patent No. 495,432, dated April 11, 1893.

Application filed October 12, 1892. Serial No. 448,656. (No model.)

*To all whom it may concern:*

Be it known that I, JESSE W. ROBERTS, a citizen of the United States, and a resident of Philadelphia, Pennsylvania, have invented certain Improvements in Paris-Green Distributers, of which the following is a specification.

My invention relates to machines for distributing upon growing plants in the form of spray, solutions of paris green and similar insect poisons, and said invention consists of certain improvements in the construction and arrangement of the various parts of the machine by which I am enabled to more thoroughly and effectively distribute the material, as described hereinafter.

Figure 1:
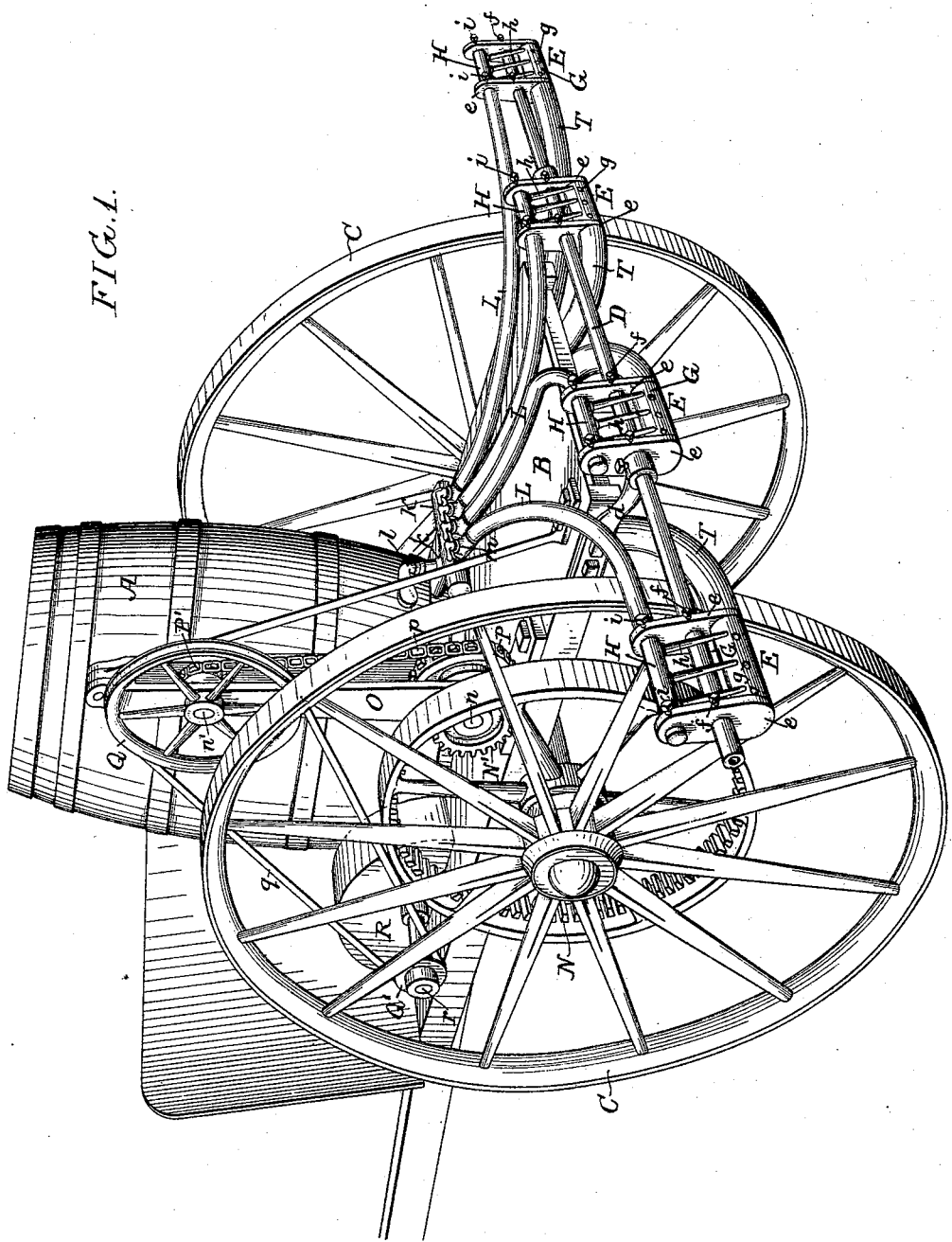
Figure 2:
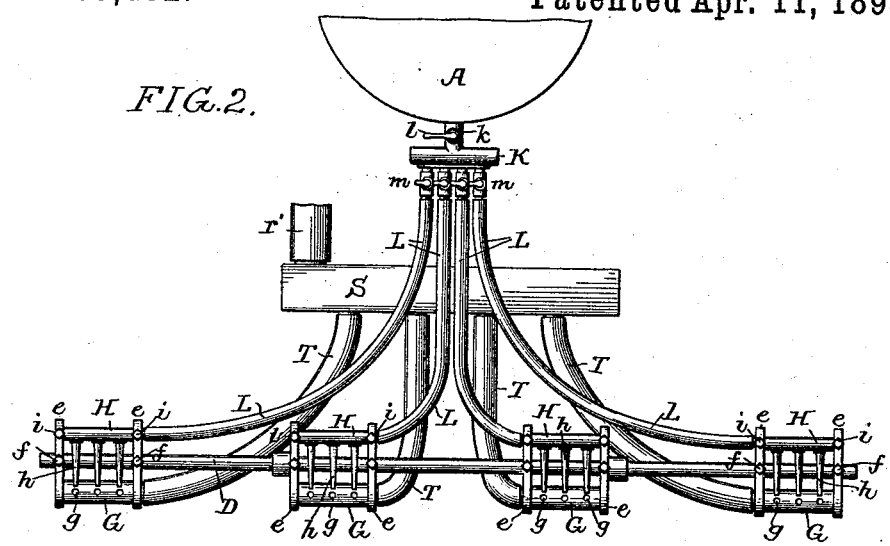
Figure 3:
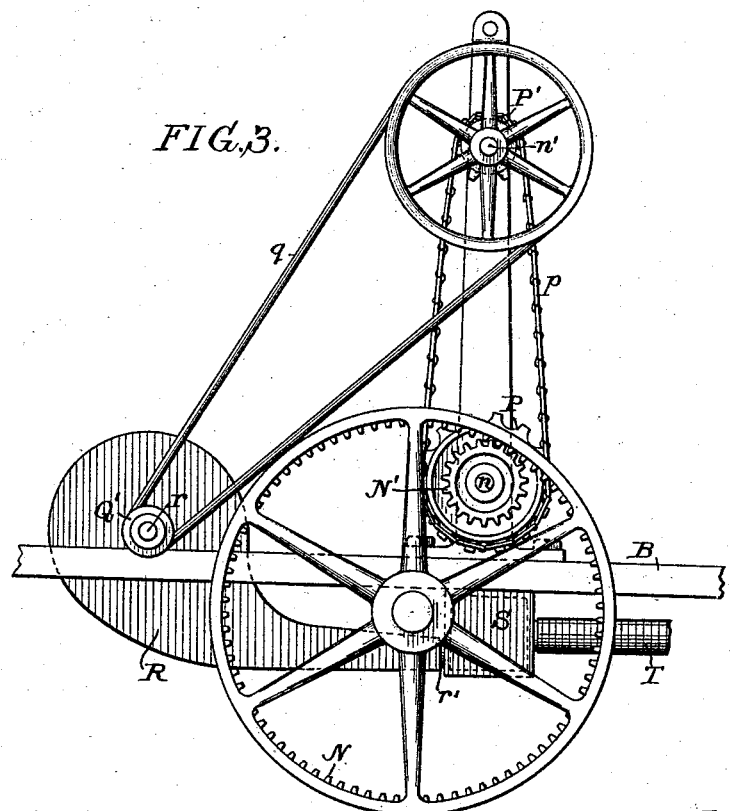

In the accompanying drawings:—Figure 1, is a perspective view of a distributing machine constructed in accordance with my invention; and Figs. 2 and 3, are diagrams illustrating those features of construction of the machine to which my invention particularly relates.

The machine forming the subject of this invention is intended for the distribution upon rows of growing plants, of paris green or other insect destroying material mixed in solution with water, and to that end the machine is provided with a series of distributing devices to each of which an equal quantity of the solution is furnished, said distributing devices being so arranged that they may be adjusted to suit the varying distances between the rows, and to direct the spray in any desired direction, and so that a greater or less number of distributing devices may be employed.

Referring to the drawings, A represents a tank in which is contained the solution of paris green or other material to be distributed, the tank being mounted upon the body B of a platform wagon having supporting wheels C as shown.

Extending transversely across the rear of the machine is a rod D which is supported in position by brackets $d$ secured to the rear of the platform B and mounted upon this rod is a series of distributers E each having opposite end plates $e\ e$ provided with set screws $f$ by which they may be secured in any desired position on the rod.

Extending between the two plates of each distributer is an air pipe G provided with a series of openings $g$ and a fluid pipe H provided with a series of nozzles $h$ terminating at a point at or about the line of the openings $g$, the pipe being adjustable around its axis, so as to vary the position of the nozzles in respect to the openings $g$, set screws $i$ serving to secure the pipe H in position after adjustment.

Mounted immediately in the rear of the tank A is a pipe K communicating with the tank through a pipe $k$ provided with a cock $l$ by which the flow into the pipe K may be governed, and from the valved nozzles $m$ on this pipe K to the pipes H extends a series of tubes L so that the solution may be permitted to flow to one, two, or more of the distributing devices as desired.

To the hub of one of the wheels C is secured an internal gear wheel N which meshes with a pinion N' on a shaft $n$ mounted in suitable bearings in a frame O and provided with a sprocket wheel P from which extends a link belt $p$ to a second sprocket wheel P' on a shaft $n'$ also mounted in the pedestal O, the latter shaft being also provided with a belt wheel Q from which extends a driving belt $q$ to a pulley Q' on a fan shaft $r$, the fan being of any ordinary construction and contained within a casing R having an exit pipe $r'$ which communicates with a distributing box S from which leads a series of pipes T to the air pipes G of the distributing devices.

In operation, the machine is drawn along over the rows of plants, the atomizing devices having previously been adjusted on the rod D with respect to the distance between the rows of plants and the plates E being tilted to any desired angle in order to throw the spray either directly to the rear or at an angle upward or downward according to the height and character of the plants to be treated.

With a device of this construction I am enabled to thoroughly coat both the under and upper surfaces of all of the leaves of the plants and by making the atomizing devices adjustable the machine can be caused to operate without waste upon plants in rows of varying widths.

Having thus described my invention, I claim and desire to secure by Letters Patent—

1. The combination in an atomizing or sprinkling device of the wheeled truck, the tank, a series of independent laterally adjustable atomizing devices, carried by the machine and each having a separate communication with the tank, a blower or fan and a connecting pipe extending from said blower or fan to each of the atomizing devices, substantially as specified.

2. The combination in an atomizing device, of the wheeled truck, the tank, a pipe communicating with said tank, a series of independent adjustable atomizing devices carried by the machine, tubes connecting each of such atomizing devices to the tank pipe, a blower or fan, an air distributing box communicating therewith, and pipes connecting each of the atomizing devices separately to the air distributing box, substantially as specified.

3. The combination in an atomizing device, of the wheeled truck, the tank, a transverse rod at the rear of the truck, a series of atomizing devices carried by said rod and capable of both lateral and circumferential adjustment thereon, pipes connecting such atomizing devices with the tank, a blower, and pipes connecting the atomizing devices with the blower, substantially as specified.

4. The combination in an atomizing device, of a perforated pipe, an air supply therefor, a liquid supply pipe having projecting nozzles, and adjusting devices to vary the relation of the nozzles to the perforations of the air pipe, substantially as specified.

In testimony whereof I have signed my name to this specification in the presence of two subscribing witnesses.

JESSE W. ROBERTS.

Witnesses:
JOSEPH H. KLEIN,
HARRY SMITH.